United States Patent

Yu

(10) Patent No.: US 12,461,588 B2
(45) Date of Patent: Nov. 4, 2025

(54) ELECTRONIC DEVICE READABLE MEDIUM, DISPLAY AND OPERATING METHOD THEREOF

(71) Applicant: AmTRAN Technology Co., Ltd., New Taipei (TW)

(72) Inventor: Hung Ta Yu, New Taipei (TW)

(73) Assignee: AmTRAN Technology Co., Ltd., New Taipei (TW)

(*) Notice: Subject to any disclaimer, the term of this patent is extended or adjusted under 35 U.S.C. 154(b) by 7 days.

(21) Appl. No.: 18/329,596

(22) Filed: Jun. 6, 2023

(65) Prior Publication Data

US 2024/0281053 A1 Aug. 22, 2024

(30) Foreign Application Priority Data

Feb. 20, 2023 (TW) ................................ 112106182

(51) Int. Cl.
G06F 3/01 (2006.01)
G06T 7/73 (2017.01)

(52) U.S. Cl.
CPC ............. G06F 3/011 (2013.01); G06T 7/73 (2017.01); *G06T 2207/30196* (2013.01); *G06T 2207/30242* (2013.01)

(58) Field of Classification Search
CPC . G06F 3/011; G06F 3/017; G06T 7/73; G06T 2207/30196; G06T 2207/30242; G06V 40/117
See application file for complete search history.

(56) References Cited

U.S. PATENT DOCUMENTS

| 8,342,963 | B2 | 1/2013 | Steiner et al. | |
| 9,247,236 | B2 | 1/2016 | Bell | |
| 9,313,439 | B2 | 4/2016 | Lee et al. | |
| 10,139,906 | B1* | 11/2018 | Bai | G06F 3/014 |
| 11,269,481 | B2 | 3/2022 | Holz | |
| 2004/0193413 | A1* | 9/2004 | Wilson | H04N 13/239 |
| | | | | 382/209 |
| 2010/0194713 | A1* | 8/2010 | Kawashima | G06F 3/04883 |
| | | | | 345/175 |

(Continued)

FOREIGN PATENT DOCUMENTS

| CN | 1508884 A | 6/2004 |
| CN | 114995740 A | 9/2022 |

(Continued)

*Primary Examiner* — Temesghen Ghebretinsae
*Assistant Examiner* — Sosina Abebe
(74) *Attorney, Agent, or Firm* — CKC & Partners Co., LLC

(57) ABSTRACT

A display includes a processor, a display module, a camera and a storage device. The display module is coupled to the processor. The camera is coupled to the processor, and configured to capture an image of a hand to generate a hand image. The storage device is coupled to the processor, and stores one or a plurality of program codes. When the processor reads and executes the code(s), at least following steps are performed: determining a number of finger(s) appeared in the hand image according to multiple feature points of the hand image; and determining, according to a value of the number of finger(s), to perform at least one of two operations in following: performing a preset operation to the display and generating a control signal, in which the control signal is configured for controlling an external device.

19 Claims, 6 Drawing Sheets

(56) References Cited

U.S. PATENT DOCUMENTS

| | | | |
|---|---|---|---|
| 2013/0061258 A1 | 3/2013 | Takaya et al. | |
| 2014/0203939 A1 | 7/2014 | Harrington et al. | |
| 2014/0253512 A1* | 9/2014 | Narikawa | G06F 3/0304 345/175 |
| 2014/0320684 A1 | 10/2014 | Chatenever et al. | |
| 2016/0091980 A1* | 3/2016 | Baranski | A61B 5/6824 345/156 |
| 2016/0246369 A1* | 8/2016 | Osman | A63F 13/212 |
| 2017/0147075 A1* | 5/2017 | Lerner | G06F 3/017 |
| 2018/0350105 A1* | 12/2018 | Taylor | G06T 7/162 |
| 2019/0251214 A1* | 8/2019 | Li | B33Y 10/00 |
| 2019/0294870 A1* | 9/2019 | Xie | G06F 3/017 |
| 2019/0311190 A1* | 10/2019 | Wang | G06V 40/113 |
| 2020/0209951 A1* | 7/2020 | Ikeda | G06F 3/0481 |
| 2020/0272235 A1* | 8/2020 | Ng | G06F 3/017 |
| 2020/0401231 A1* | 12/2020 | Ahn | G06T 7/11 |
| 2021/0081104 A1* | 3/2021 | Chung | G06V 10/82 |
| 2024/0020918 A1* | 1/2024 | Ueno | G06T 7/00 |

FOREIGN PATENT DOCUMENTS

| | | | |
|---|---|---|---|
| TW | M598978 U | 7/2020 | |
| WO | WO-2023077886 A1 * | 5/2023 | G06F 3/011 |

* cited by examiner

ND OPERATING
ELECTRONIC DEVICE READABLE MEDIUM, DISPLAY AND OPERATING METHOD THEREOF

CROSS-REFERENCE TO RELATED APPLICATION

This application claims priority to Taiwan Application Serial Number 112106182, filed Feb. 20, 2023, which is herein incorporated by reference in its entirety.

BACKGROUND

Technical Field

The present disclosure relates to a display technology. More particularly, the present disclosure relates to an electronic device readable medium, display and operating method of a display.

Description of Related Art

With respect to the progress of computer technology, algorithms and hardware performance, various methods for controlling a display by artificial intelligence occur. However, the methods described above do not integrate controlling of the environment light and the display. If the user want to switch between various mode, such as a move mode, a vivid mode and a game mode, complicated operations need to be performed, which result in inconvenience for using and longer consumed time. Thus, techniques associated with the development for overcoming problems described above are important issues in the field.

SUMMARY

The present disclosure provides a display. The display includes a processor, a display module, a camera and a storage device. The display module is coupled to the processor. The camera is coupled to the processor, and configured to capture an image of a hand to generate a hand image. The storage device is coupled to the processor, and stores one or a plurality of program codes. When the processor reads and executes the code(s), at least following steps are performed: determining a number of finger(s) appeared in the hand image according to multiple feature points of the hand image; and determining, according to a value of the number of finger(s), to perform at least one of two operations in following: performing a preset operation to the display and generating a control signal, in which the control signal is configured for controlling an external device.

The present disclosure provides an operating method of a display comprising capturing an image of a hand by a camera, to generate a hand image; determining a number of finger(s) appeared in the hand image according to feature points of the hand image; and according to a value of the number of finger(s) to determine performing at least one of two operations in following: performing a preset operation to the display and generating a control signal, wherein the control signal is configured for controlling an external device.

The present disclosure provides an electronic device readable medium suitable for a display storing one or a plurality of program codes. The code(s) are read and executed to perform at least following steps: using a camera to capture an image of a hand to generate a hand image; determining a number of finger(s) appeared in the hand image according to feature points of the hand image; and according to a value of the number of finger(s) to determine performing at least one of two operations in following: performing a preset operation to the display and generating a control signal, wherein the control signal is configured for controlling an external device.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
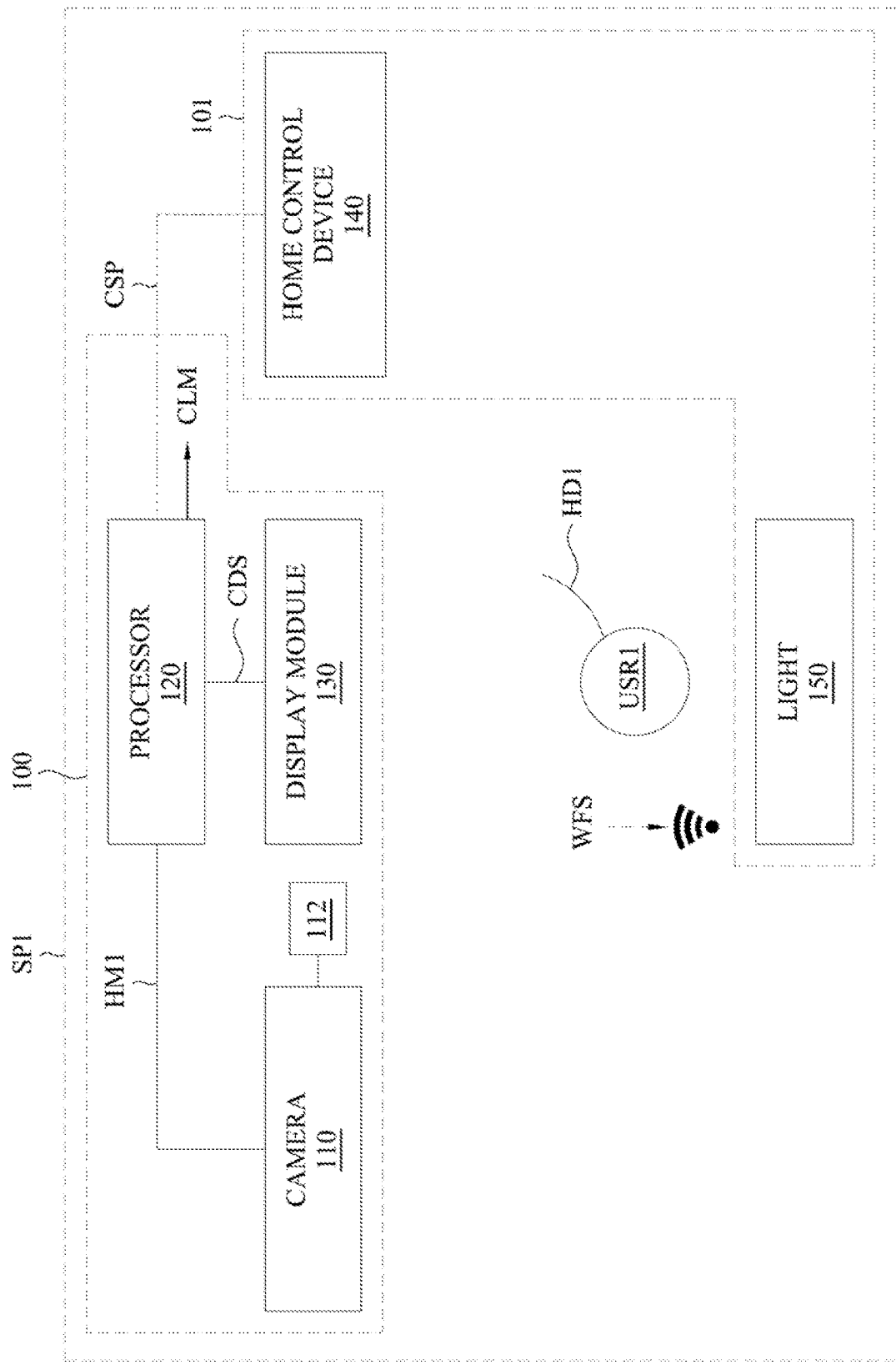
FIG. 1A is a schematic diagram of a display and an external device illustrated according to some embodiments of this disclosure.

In the present disclosure, when an element is referred to as "connected" or "coupled", it may mean "electrically connected" or "electrically coupled". "Connected" or "coupled" can also be used to indicate that two or more components operate or interact with each other. In addition, although the terms "first", "second", and the like are used in the present disclosure to describe different elements, the terms are used only to distinguish the elements or operations described in the same technical terms. The use of the term is not intended to be a limitation of the present disclosure.

Unless otherwise defined, all terms (including technical and scientific terms) used in the present disclosure have the same meaning as commonly understood by the ordinary skilled person to which the concept of the present invention belongs. It will be further understood that terms (such as those defined in commonly used dictionaries) should be interpreted as having a meaning consistent with its meaning in the related technology and/or the context of this specification and not it should be interpreted in an idealized or overly formal sense, unless it is clearly defined as such in this article.

The terms used in the present disclosure are only used for the purpose of describing specific embodiments and are not intended to limit the embodiments. As used in the present disclosure, the singular forms "a", "one" and "the" are also intended to include plural forms, unless the context clearly indicates otherwise. It will be further understood that when used in this specification, the terms "comprises (comprising)" and/or "includes (including)" designate the existence of stated features, steps, operations, elements and/or components, but the existence or addition of one or more other features, steps, operations, elements, components, and/or groups thereof are not excluded.

Hereinafter multiple embodiments of the present disclosure will be disclosed with schema, as clearly stated, the details in many practices it will be explained in the following description. It should be appreciated, however, that the details in these practices is not applied to limit the present disclosure. Also, it is to say, in some embodiments of the present disclosure, the details in these practices are non-essential. In addition, for the sake of simplifying schema, some known usual structures and element in the drawings by a manner of simply illustrating for it.

FIG. 1A is a schematic diagram of a display 100 and an external device 101 illustrated according to some embodiments of this disclosure. As illustratively shown in FIG. 1A, the display 100 and the external device 101 are located in a space SP1. The display 100 includes a camera 110, a light emitting unit 112, a processor 120 and a display module 130. The processor 120 is coupled to each of the camera 110 and the display module 130. In some embodiments, the camera 110 can be implemented by a camera, an image sensing chip or other ways. The light emitting unit 112 can be implemented by an infrared light. The display module 130 can be implemented by a screen. The implementations described above are merely for example. The present disclosure does not limit implementations of the camera 110, the light emitting unit 112 and the display module 130.

As illustratively shown in FIG. 1A, the external device 101 is, for example, a home control device 140 and/or a light 150. However, the present disclosure does not limit to this. In addition, in some embodiments, the home control device 140 can be implemented as, but not limit to, a smart speaker or controller of other types.

In some embodiments, the camera 110 is configured to capture an image of a hand HD1 of the user USR1 in the space SP1, to generate a hand image HM1. The processor 120 is configured to control the display module 130 and/or the external device 101 according to the hand image HM1. In some embodiments, the external device 101 is, for example, the home control device 140, the light 150 or other devices.

In some embodiments, when the camera 110 captures an image of the hand HD1, the light emitting unit 112 is configured to generate light corresponding to a photosensitive element in the camera 110, to emit the light to the hand HD1, and make the hand image HM1 clearer. For example, when a sensitive wavelength of the photosensitive element in the camera 110 is approximately at 850 nm, the light emitting unit 112 generates infrared light with a wavelength approximately at 850 nm. In the example described above, the display 100 has a higher image recognition successful rate. In various embodiments, the light emitting unit 112 can generate various infrared lights with various such as those ranging from 780 nm to 880 nm.

In some embodiments, visible lights (for example, lights between wavelength range 380 nm to 780 nm) in the space SP1 have a brightness of approximately 0 lux. In the embodiments described above, the camera 110 can still identify the hand HD1 by the infrared light generated by the light emitting unit 112, to generate the hand image HM1.

In some embodiments, the display module 130 is configured to display pictures to the user USR1 according to a control signal CDS. The home control device 140 is configured to play audio to the user USR1 according to a control signal CSP. In some other embodiments, the processor 120 can control the brightness of the light 150 based on a control signal CLM output from the processor 120 and a communication signal WFS for illuminating the space SP1 where the user USR1 and the display module 130 are located.

In other embodiments, the processor 120 can also output the control signal CSP to the home control device 140, such as a remote controller or a smart speaker, and use the home control device 140 to control the brightness of the light 150.

In addition, in some embodiments, the processor 120 can be implemented by a microprocessor (MCU), a central processing unit (CPU), a graphic processing unit (GPU), a single chip, an application specific integrated circuit (ASIC), an embedded system or a micro system.

Figure 1B:
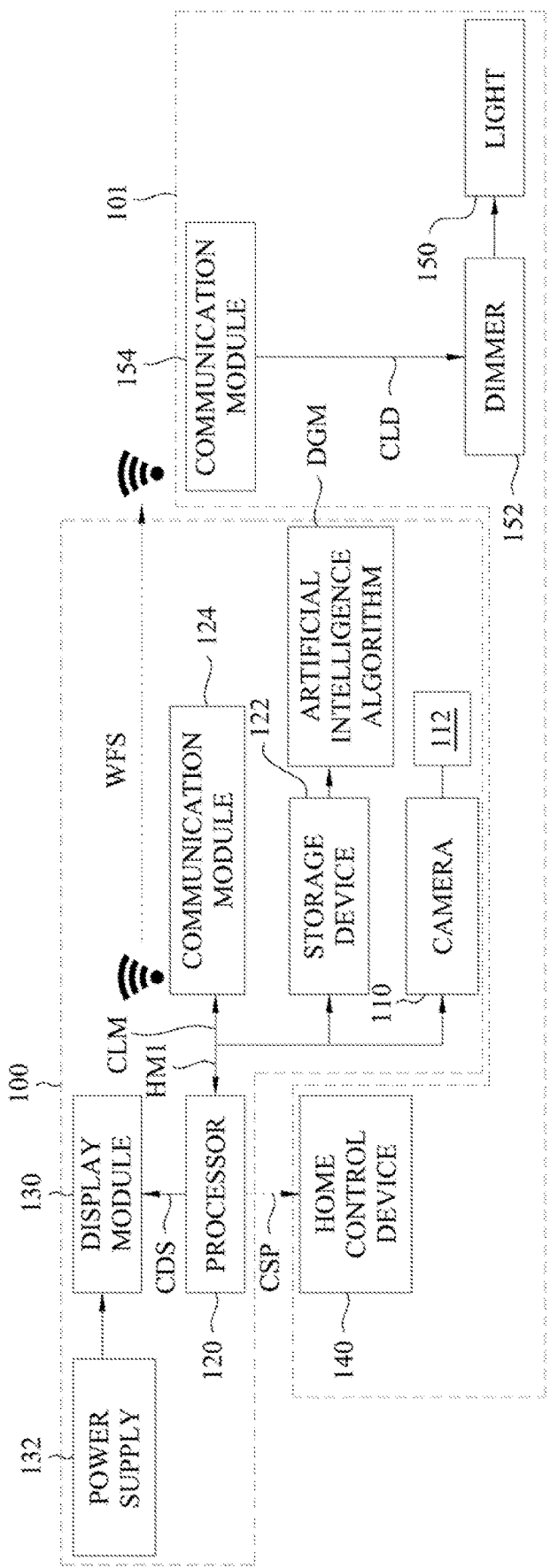
FIG. 1B is a schematic diagram of further details of the display and the external device illustrated according to some embodiments of this disclosure.

FIG. 1B is a schematic diagram of further details of the display 100 and the external device 101 illustrated according to some embodiments of this disclosure. As illustratively shown in FIG. 1B, the display 100 further includes a power supply 132, a storage device 122 and a communication module 124. The power supply 132 is coupled to the display module 130. The processor 120 is coupled to each of the storage device 122 and the communication module 124. In some embodiments, the storage device 122 can be implemented by a memory.

As illustratively shown in FIG. 1B, the external device 101 can further include a communication module 154 and a dimmer 152. The communication module 154 can be coupled to the dimmer 152. The light 150 can be coupled to the dimmer 152. In some embodiments, the external device 101 may not include the dimmer 152.

In some embodiments, the storage device 122 stores one or a plurality of program codes. When the processor 120 reads and executes the code(s) described above, at least following steps are performed: determining a number of finger(s) appearing in the hand image HM1 according to multiple feature points (such as the feature points N11-N14, N21-N24, N31-N34, N41-N44, N51-N54 and N6 shown in FIG. 3A) of the hand image HM1; and determining whether performing at least one in following two operations according to a value of the number of finger(s), to: performing a preset operation to the display module 130 and generating a control signal (such as the control signal CSP and/or CLM), in which the control signal is configured to control the external device 101. In some embodiments, the storage device 122 can include an electronic device readable medium. The electronic device readable medium stores code(s) described above, such that the code(s) are read to execute at least steps described above.

In some embodiments, the feature points described above correspond to a wrist and joints of each finger. For example, the feature point N6 corresponds to a wrist. The feature points N11-N14, N21-N24, N31-N34, N41-N44 and N51-N54 correspond to joints of each finger.

In some embodiments, when the processor 120 reads and executes the code(s) described above, at least following step is performed: according to a hand posture of the hand image HM1, to perform at least one in following two operations: controlling the preset operation and generating the control signal. The hand posture can be determined by the feature points.

In some embodiments, the preset operation at least includes adjusting one of a volume of the display 100, a backlight brightness, a color display mode (such as the first mode to the fourth mode shown in FIG. 2), and a frame rate.

In some embodiments, the control signal CLM is configured to control luminosity and/or a color temperature of the light 150.

In some embodiments, the power supply 132 is configured to power the display module 130. The power supply 132 can be implemented by an alternating current to direct current power supply.

In some embodiments, the communication module 124 is configured to generate a corresponding communication signal WFS according to the control signal CLM, and transmit the communication signal WFS to the communication module 154. The communication module 154 is configured to generate a control signal CLD according to the communication signal WFS. The dimmer 152 is configured to adjust the luminosity of the light 150 according to the control signal CLD.

In some embodiments, the communication module 124 can be implemented by a Wi-Fi module. The communication module 154 can be implemented by a microcontroller (such as NodeMCU) having Wi-Fi function. The communication signal WFS can be implemented by a Wi-Fi signal. The control signal CLD can be implemented by a pulse-width modulation (PWM) signal.

In some embodiments, the storage device 122 is configured to store data of an algorithm DGM. The processor 120 is configured to determining hand postures corresponding to the hand image HM1 according to the algorithm DGM, and generates the control signals CDS, CSP and CLM according to the hand postures. In various embodiments, the algorithm DGM can correspond to various algorithms, such as artificial intelligence algorithms.

Figure 2:
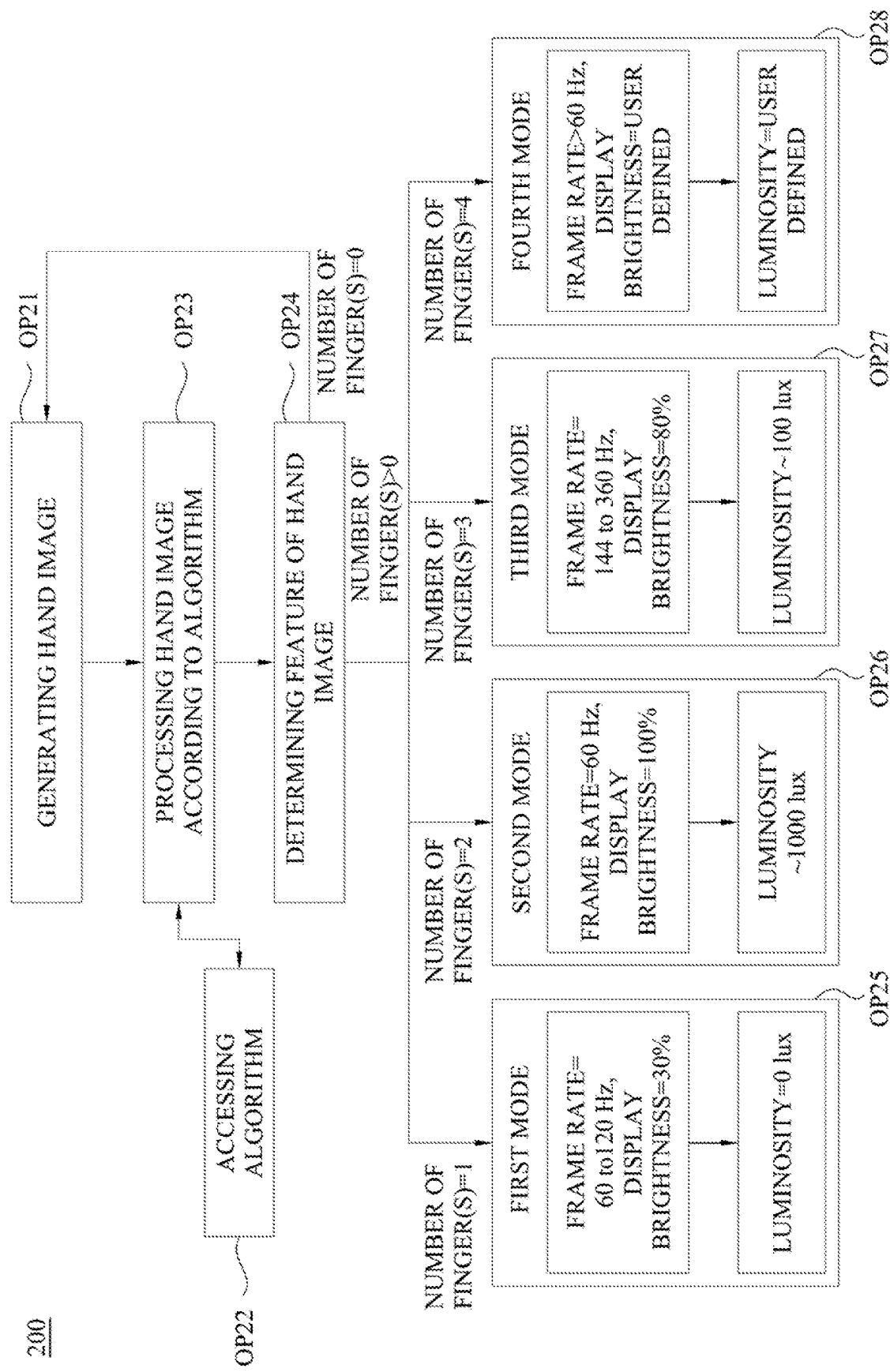
FIG. 2 is a flowchart diagram of an operating method illustrated according to some embodiments of this disclosure.

FIG. 2 is a flowchart diagram of an operating method 200 illustrated according to some embodiments of this disclosure. Referring to FIG. 2, the operating method 200 includes operations OP21 to OP28. The following description of operations OP21 to OP28 is provided with reference to the display 100 shown in FIG. 1B, but this disclosure is not limited to this embodiment. In various embodiments, the operations OP21 to OP28 can be executed in various sequences by different types of displays. However, a person having ordinary skill in the art should know, the process disclosed by FIG. 2 is merely for descriptions, and is not for limiting the present disclosure.

At the operation OP21, the camera 110 captures an image of the hand HD1 to generate the hand image HM1. At the operation OP22, the processor 120 accesses the data of the algorithm DGM from the storage device 122. At the operation OP23, the processor 120 processes the hand image HM1 according to the algorithm DGM. At the operation OP24, the processor 120 determines the features of the hand image HM1. For example, the processor 120 determines a number of finger(s) corresponding to the hand image HM1.

When the number of finger(s) corresponding to the hand image HM1 is equal to 0, the display 100 performs the operation OP21 again, to update the hand image HM1 continuously. When the number of finger(s) corresponding to the hand image HM1 is larger than 0, the display 100 performs different operations according to different number of finger(s).

When the number of finger(s) is equal to 1, the display 100 performs the operation OP25. When the number of finger(s) is equal to 2, the display 100 performs the operation OP26. When the number of finger(s) is equal to 3, the display 100 performs the operation OP27. When the number of finger(s) is equal to 4, the display 100 performs the operation OP28.

At the operation OP25, the processor 120 adjusts the display module 130 and the light 150 to a first mode. At the operation OP26, the processor 120 adjusts the display module 130 and the light 150 to a second mode. At the operation OP27, the processor 120 adjusts the display module 130 and the light 150 to a third mode. At the operation OP28, the processor 120 adjusts the display module 130 and the light 150 to a fourth mode.

At the first mode, the processor 120 simultaneously adjusts a frame rate of the display module 130 to approximately 60 to 120 Hz, a display brightness of the display module 130 to approximately 30% of the highest display brightness, and luminosity of the light 150 to approximately 0 lux. In some embodiments, the first mode is referred to as a movie mode.

At the second mode, the processor 120 simultaneously adjusts the frame rate of the display module 130 to approximately 60 Hz, the display brightness of the display module 130 to approximately 100% of the highest display brightness, and the luminosity of the light 150 to approximately 1000 lux. In some embodiments, the second mode is referred to as a vivid mode.

At the third mode, the processor 120 simultaneously adjusts the frame rate of the display module 130 to approximately 144 to 360 Hz, the display brightness of the display module 130 to approximately 80% of the highest display brightness, and the luminosity of the light 150 to approximately 100 lux. In some embodiments, the third mode is referred to as a gaming mode.

At the fourth mode, the processor 120 simultaneously adjusts the frame rate of the display module 130 to greater than 60 Hz, the display brightness of the display module 130 to a user defined display brightness, and the luminosity of the light 150 to a user defined luminosity. In some embodiments, the fourth mode is referred to as a user defined mode. The user USR1 can store the user defined display brightness and the user defined luminosity in the storage device 122, for providing to the processor 120 for controlling.

In various embodiments, there may be different correspondences between the first mode to the fourth mode and the number of finger(s) number of finger(s). For example, when the number of finger(s) is equal to 1, the processor 120 can also adjust the display 100 to one of the second mode to the fourth mode, instead of adjusting to the first mode.

In some embodiments, settings of the first mode to the fourth mode are stored in the storage device 122. The scope of the present disclosure is not limited to the settings of the first mode to the fourth mode described above. In various embodiments, the first mode to the fourth mode can have various settings. A mode number of the display 100 can be larger than four.

In some approaches, a display system captures hand postures by a camera, and adjusts a display brightness of the display according to the hand postures. However, the above-described approach does not control according to the number of finger(s), nor does it simultaneously control the display brightness, frame rate and luminosity of surrounding environment.

Compared to above approaches, in embodiments of present disclosure, the processor 120 adjusts a mode of the display 100 according to the number of finger(s), and adjusts the luminosity of the light 150, the display brightness and the frame rate of the display module simultaneously. As a result, the user USR1 can adjust the display 100 to a desired mode, such as the movie mode, the vivid mode or the game mode, through the hand postures according to different usage requirements.

Figure 3A:
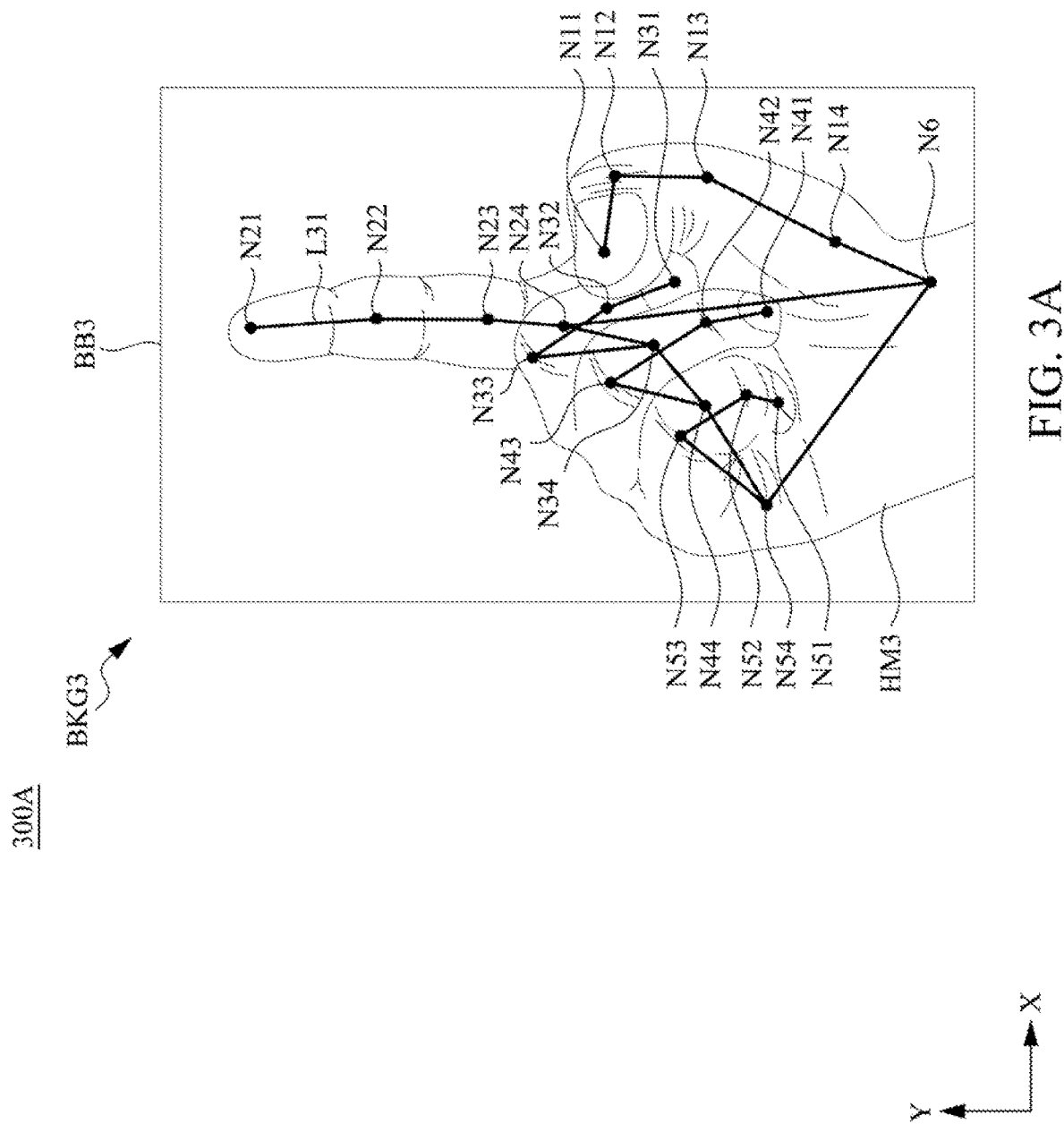
FIG. 3A is a schematic diagram of an image illustrated according to some embodiments of this disclosure.

FIG. 3A is a schematic diagram of an image 300A illustrated according to some embodiments of this disclosure. In some embodiments, the camera 110 shown in FIG. 1A is configured to capture an image of the hand HD1 to generate the image 300A, such that the processor 120 processes the image 300A. As illustratively shown in FIG. 3A, the image 300A includes a hand image HM3, a background image BKG3, a bounding box BB3 and feature points N11-N14, N21-N24, N31-N34, N41-N44, N51-N54, N6.

In some embodiments, the processor 120 is configured to distinguish the hand image HM3 and the background image BKG3 according to pixel colors of the image 300A and the algorithm DGM. For example, when the processor 120 detects a continuous area of skin color portion in the image 300A has that exceeds a preset area, it determines whether the skin color portion described above is the hand image HM3 according to hand features set by the algorithm DGM. Referring FIG. 1A and FIG. 3A, the hand image HM3 is an embodiment of the hand image HM1. Therefore, some descriptions are not repeated for brevity.

In some embodiments, the processor 120 is configured to draw the bounding box BB3 according to the hand image HM3, and mark the feature points N11-N14, N21-N24, N31-N34, N41-N44, N51-N54 and N6 on the hand image HM3 corresponding to different parts of the hand image HM3 according to the algorithm DGM. In various embodiments, the processor 120 marks the different parts of the hand image HM3 by various numbers of feature points, such as 25 feature points.

In some embodiments, each of the feature points N11-N14, N21-N24, N31-N34, N41-N44, N51-N54 and N6 has an X coordinate corresponding to the X direction and a Y coordinate corresponding to the Y direction. In which the X direction and the Y direction are perpendicular with each other.

As illustratively shown in FIG. 3A, the feature points N11-N14 correspond to a thumb, the feature points N21-N24 correspond to an index finger, the feature points N31-N34 correspond to a middle finger, the feature points N41-N44 correspond to a ring finger, the feature points N51-N54 correspond to a little finger, and the feature point N6 correspond to a wrist. The feature points N11, N21, N31, N41 and N51 correspond to fingertips of the thumb, the index finger, the middle finger, the ring finger and the little finger, respectively. The feature points N14, N24, N34, N44 and N54 correspond to finger roots of the thumb, the index finger, the middle finger, the ring finger and the little finger, respectively.

In some embodiments, when skin color pixels between two feature points can form a continuous straight line connecting the two feature points, the processor 120 connects the two feature points to each other by the straight line described above. For example, a straight line L31 is formed by continuous skin color pixels between the features points N21 and N22, such that the processor 120 connects the features points N21 and N22 by the straight line L31. On the other hand, there are non-skin color pixels between the features points N21 and N51, such that a straight line cannot be formed by continuous skin color pixels between the features points N21 and N51. Accordingly, the processor 120 does not connect the features points N21 and N51.

In some embodiments, the processor 120 is configured to determine a feature point connected to only one other feature point as the feature point corresponding to a fingertip. For example, the feature point N21 is only connected to one feature point N22, and the feature point N22 is connected to two feature points N21 and N23. Accordingly, the processor 120 determines the feature point N21 corresponding to a fingertip, and determines the feature point N22 not corresponding to a fingertip.

In some embodiments, the processor 120 is configured to determine a corresponding finger according to distances between the feature points of the fingertips and the feature point of the wrist. For example, the processor 120 compares the distances from each of the feature points N11, N21, N31, N41 and N51 connecting to the feature point N6. In which the distance from the feature point N11 connecting to the feature point N6 is the smallest, and the distance from the feature point N31 connecting to the feature point N6 is the largest. In general, a distance between the thumb and the wrist is the smallest, and a distance between the middle finger and the wrist is the largest. Accordingly, the processor 120 determines the thumb corresponding to the feature point N11, and the middle finger corresponding to the feature point N31.

In some embodiments, the processor 120 is configured to determine a corresponding number of finger(s) of the hand image HM3 according to relationships between the fingertip coordinates and the finger root coordinates. The processor 120 can compare the Y coordinates of the fingertip feature points N21, N31, N41 and N51 with the Y coordinates of the finger root feature points N24, N34, N44 and N54, to determine whether the corresponding finger extends or not, and determining the number of finger(s) accordingly.

For example, in the embodiments shown in FIG. 3A, the Y coordinate of the feature point N21 is larger than the Y coordinate of the feature point N24, and the Y coordinates of the feature points N31, N41 and N51 are smaller than the Y coordinates of the feature points N34, N44 and N54, respectively. Accordingly, the processor 120 determines that the index finger extends, the middle finger, the ring finger and the little finger do not extend, and the corresponding number of finger(s) of the hand image HM3 is one. For another example, when the Y coordinates of the feature points N21 and N31 are larger than the Y coordinates of the feature point N24 and N34, respectively, and the Y coordinates of the feature points N41 and N51 are smaller than the Y coordinates of the feature points N44 and N54, respectively, the processor 120 determines that the index finger and the middle finger extend, the ring finger and the little finger do not extend, and the corresponding number of finger(s) of the hand image HM3 is two.

In some embodiments, the processor 120 is configured to determine the hand image HM3 corresponding to a left hand or a right hand according to the coordinates of the thumb and other fingers. For example, in the embodiments shown in FIG. 3A, the X coordinate of the feature point N11 is larger than the X coordinate of each of the feature points N21, N31, N41 and N51, such that the processor 120 determines the hand image HM3 as the right hand. In some other embodiments, when the X coordinate of the feature point N11 is smaller than the X coordinate of each of the feature points N21, N31, N41 and N51, the processor 120 determines the hand image HM3 as the left hand.

In various embodiments, the processor 120 can set the display 100 to different mode depending on whether the left hand or the right hand. For example, the processor 120 can adjust the display 100 to the first mode to the fourth mode shown in FIG. 2 according to the number of finger(s) of the right hand, and can also adjust the display 100 to other modes different from the first mode to the fourth mode described above according to the number of finger(s) of the left hand.

Figure 3C:
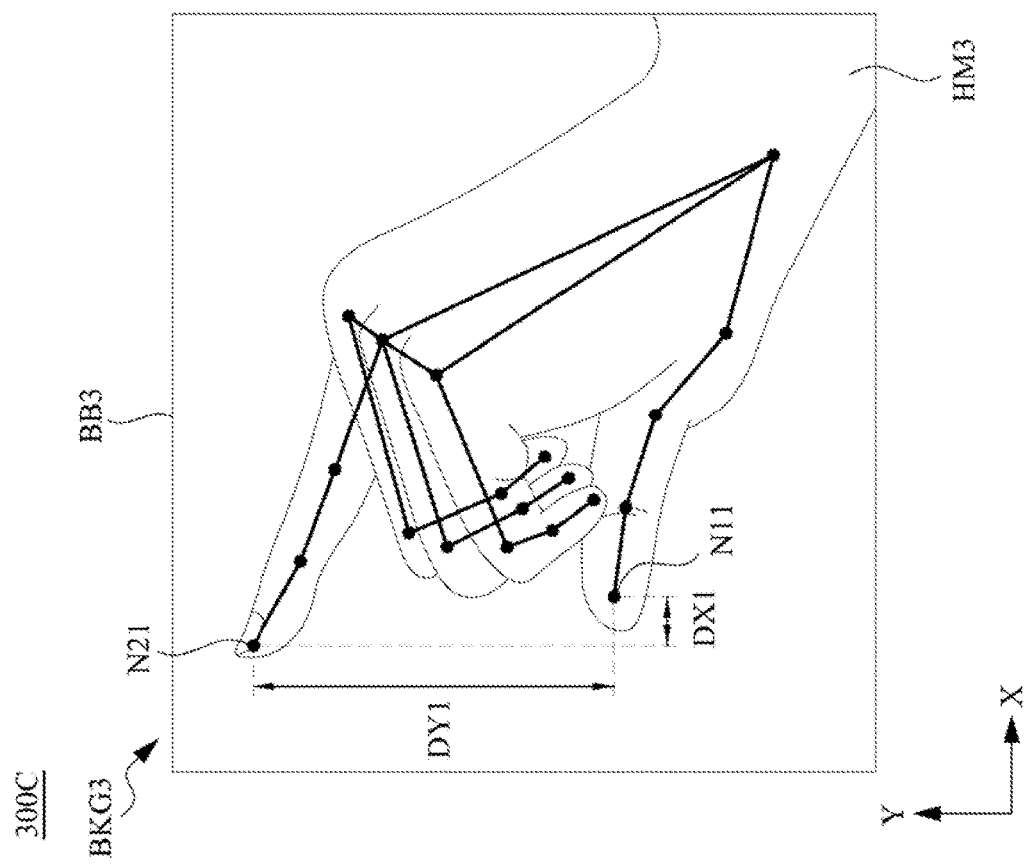
FIG. 3C is a schematic diagram of an image illustrated according to some embodiments of this disclosure.
Figure 3B:
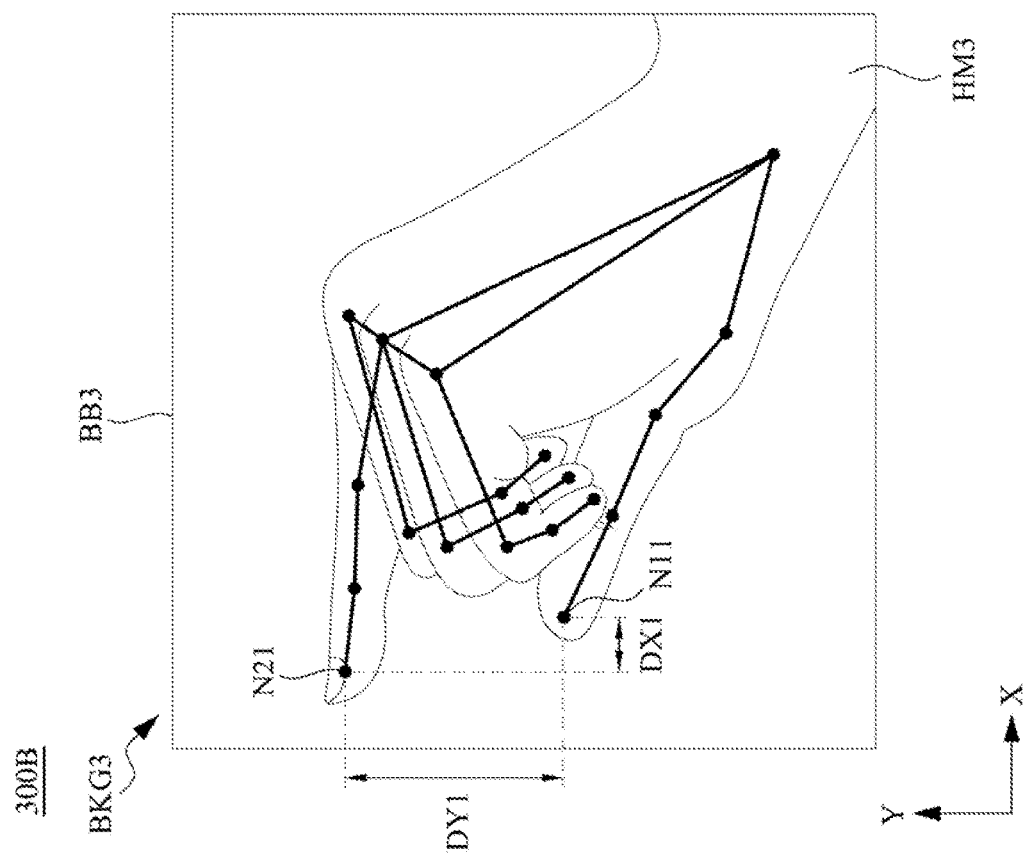
FIG. 3B is a schematic diagram of an image illustrated according to some embodiments of this disclosure.

FIG. 3B is a schematic diagram of an image 300B illustrated according to some embodiments of this disclosure. Referring to FIG. 3A and FIG. 3B, the image 300B is an alternative embodiment of the image 300A. The image 300B follows a similar labeling convention to that of the image 300A. For brevity, the discussion will focus more on differences between the images 300A and 300B than on similarities.

As illustratively shown in FIG. 3B, a distance between the X coordinates of the feature points N11 and N21 is labeled as the distance DX1. A distance between the Y coordinates of the feature points N11 and N21 is labeled as the distance DY1. In some embodiments, the processor 120 shown in FIG. 1B is configured to perform different operations according to the distances DX1 and DY1.

For example, if the distance DX1 is greater than or equal to a preset distance, the processor 120 performs preset operations to the display module 130 according to the hand image HM3. If the distance DX1 is less than the preset distance, the processor 120 generates the control signal CLM and/or CSP according to the hand image HM3, to control the external device 101.

As another example, when the distance DX1 is larger than or equal to the preset distance, the processor 120 adjusts the display 100 to the various modes shown in FIG. 2 according to the number of finger(s). When the distance DX1 is less than the preset distance, the processor 120 adjusts the luminosity of the light 150 and/or the volume of the home control device 140 according to the distance DY1. Further details of performing different operations according to the distances DX1 and DY1 is described in the embodiments associated with FIG. 4.

FIG. 3C is a schematic diagram of an image 300C illustrated according to some embodiments of this disclosure. Referring to FIG. 3A and FIG. 3C, the image 300C is an alternative embodiment of the image 300A. The image 300C follows a similar labeling convention to that of the image 300A. For brevity, the discussion will focus more on differences between the images 300A and 300C than on similarities.

In some embodiments, when the distance DY1 is increased, the processor 120 increases the luminosity of the light 150 and/or the volume of the home control device 140. Referring to FIG. 3B and FIG. 3C, compared with the image 300B, the distance DY1 in the image 300C is larger. As a result, the corresponding luminosity of the light 150 and/or the volume of the home control device 140 in image 300C is larger than that in image 300B. For example, the image 300B corresponds to 21% of the largest luminosity and/or the largest volume, and the image 300C corresponds to 92% of the largest luminosity and/or the largest volume.

In some embodiments, the hand HD1 shown in FIG. 1A changes the hand posture, such that the distances DX1 and DY1 are changed. In some conditions, the processor 120 receives the image 300C after receiving the image 300B, such that the processor 120 increases the luminosity of the light 150 and/or the volume of the home control device 140. In some conditions, the processor 120 receives the image 300B after receiving the image 300C, such that the processor 120 decreases the luminosity of the light 150 and/or the volume of the home control device 140.

Figure 4:
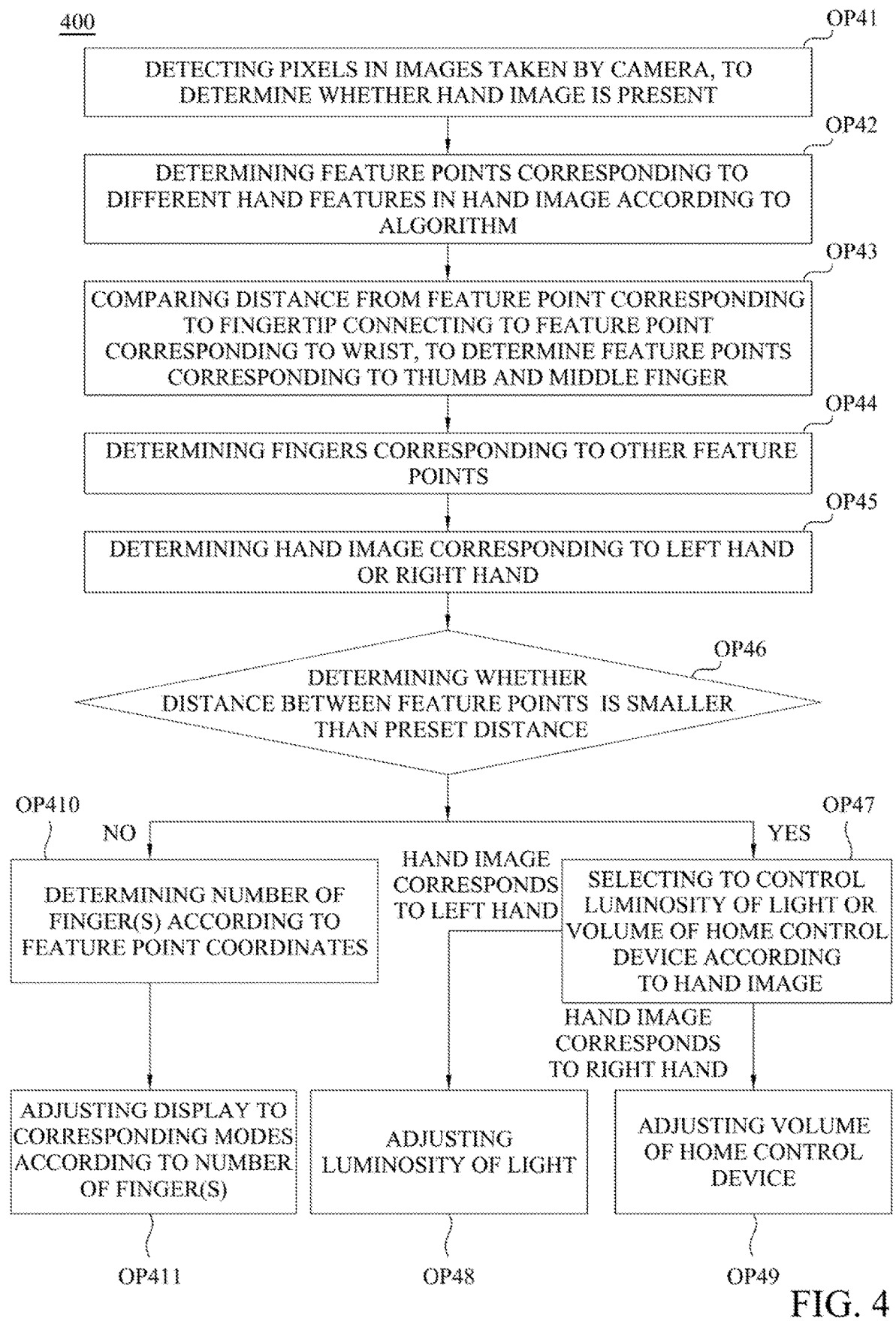
FIG. 4 is a flowchart diagram of an operating method illustrated according to some embodiments of this disclosure.

FIG. 4 is a flowchart diagram of an operating method illustrated according to some embodiments of this disclosure. Referring to FIG. 4, the operating method 400 includes operations OP41-OP411. The operations OP41-OP411 are described following with the display 100 shown in FIG. 1B, but the present disclosure is not limited to this. In various embodiments, the operations OP41-OP411 can be performed by various displays with various sequences. Similarly, the process disclosed by FIG. 2 is merely for descriptions, and is not for limiting the present disclosure.

At the operation OP41, the processor 120 detects the pixels in the images (for example, the images 300A to 300C) taken by the camera 110, to determine whether a hand image (e.g., the hand images HM1 and HM3, following example will use the hand image HM3 for illustration) is present. If the hand image HM3 is not present, the camera 110 continues to take images. If the hand image HM3 is present, the processor 120 proceeds to the operations OP42.

At the operation OP42, the processor 120 determines the feature points corresponding to different hand features, such as the feature point N6 corresponding to the wrist and the feature points N11 and N31 corresponding to the fingertips, in the hand image HM3 according to the algorithm DGM.

At the operation OP43, the processor 120 compares a distance from the feature point corresponding to a fingertip connecting to the feature point N6 corresponding to the wrist to determine the feature points corresponding to the thumb and the middle finger. For example, in the feature points N11, N21, N31, N41 and N51, a distance from the feature point N11 to the feature point N6 is the smallest, and a distance from the feature point N31 to the feature point N6 is the largest. Accordingly, the processor 120 determines that the feature point N11 corresponds to the thumb, and the feature point N31 corresponds to the middle finger.

At the operation OP44, the processor 120 determines the fingers corresponding to other feature points according to the feature points N11 and N31. For example, if the X-coordinate of the feature point N21 is between the X-coordinates of the feature points N11 and N31, the processor 120 determines that the feature point N21 corresponds to the index finger. If the feature points N51, N41, N31, N21, and N11 are arranged in sequence along the X-direction, the processor 120 determines that the feature points N41 and N51 correspond to the ring finger and the little finger, respectively.

At the operation OP45, the processor 120 determines the hand image HM3 corresponding to the left hand or the right hand according to the feature point N11 corresponding to the thumb. At the operation OP46, the processor 120 determines whether the distance DX1 between the feature points N11 and N21 along the X direction is smaller than the preset distance. When the distance DX1 is smaller than the preset distance, the processor 120 performs the operation OP47. When the distance DX1 is larger than or equal to the preset distance, the processor 120 performs the operation OP410.

At the operation OP47, the processor 120 selects to control the luminosity of the light 150 or the volume of the home control device 140 according to the hand image HM3. For example, when the hand image HM3 corresponds to the right hand, the processor 120 selects to control the volume of the home control device 140. When the hand image HM3 corresponds to the left hand, the processor 120 selects to control the luminosity of the light 150. In various embodiments, the processor 120 can make the selection according to various features of the hand image HM3.

After the operation OP47, in response to the processor 120 selecting controlling the light 150, the processor 120 performs the operation OP48. In response to the processor 120 selecting controlling the home control device 140, the processor 120 performs the operation OP49.

At the operation OP48, the processor 120 adjusts the luminosity of the light 150. For example, when the distance DY1 is increased, the processor 120 increases the luminosity of the light 150. When the distance DY1 is decreased, the processor 120 decreases the luminosity of the light 150.

At the operation OP49, the processor 120 adjusts the volume of the home control device 140. For example, when the distance DY1 is increased, the processor 120 increases the volume of the home control device 140. When the distance DY1 is decreased, the processor 120 decreases the volume of the home control device 140.

At the operation OP410, the processor 120 determines the number of finger(s) of the hand image HM3 according to the feature point coordinates of the hand image HM3. At the operation OP411, the processor 120 adjusts the display 100 to corresponding modes according to the number of finger(s) of the hand image HM3.

Referring to FIG. 4 and FIG. 2, the operations of the operating method 200 and the operations of the operating method 400 correspond to each other. For example, at the operation OP23, the processor can perform at least a part of the operations OP41-OP46, to process the hand image HM1. At the operations OP410-OP411, the processor can perform at least a part of the operations OP24-OP28, to adjust the display 100 to one of the first mode to the fourth mode.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display, comprising:
a processor;
a display module, coupled to the processor;
a camera, coupled to the processor, and configured to capture an image of a hand to generate a hand image; and
a storage device, coupled to the processor, and configured for storing one or a plurality of program codes, when the processor reads and executes the code(s), at least following steps are performed:
determining a number of finger(s) appeared in the hand image according to feature points of the hand image, further comprising: comparing coordinates of fingertip feature points with coordinates of finger root feature points to determine whether corresponding finger extends or not, and determining the number of finger(s) appeared in the hand image according to a number of extending finger; and
determining, according to a value of the number of finger(s), to perform at least one of two operations in following:
performing a preset operation to the display and generating a control signal for controlling an external device to perform an operation, and
wherein different values of the number of finger(s) correspond to different preset operations to the display and generating different control signals to control the external device to perform different operations, and same value of the number of finger(s) but different hand postures corresponds to same preset operation to the display and generating same control signal to control the external device to perform same operation.

2. The display of claim 1, wherein the feature points correspond to a wrist and joints of each finger.

3. The display of claim 1, wherein when the processor reads and executes the code(s), at least following step is performed:
according to a hand posture of the hand image, to perform at least one in following two operations: controlling the preset operation and generating the control signal.

4. The display of claim 1, wherein the preset operation at least comprises adjusting one of a volume of the display, a backlight brightness, a color display mode and a frame rate.

5. The display of claim 1, wherein the external device comprises a light or a home control device.

6. The display of claim 5, wherein the control signal is configured to control luminosity and/or a color temperature of the light.

7. An operating method of a display, comprising:
capturing an image of a hand by a camera, to generate a hand image:
determining a number of finger(s) appeared in the hand image according to feature points of the hand mage, further comprising: comparing coordinates of fingertip feature points with coordinates of finger root feature points to determine whether corresponding finger extends or not, and determining the number of finger(s) appeared in the hand image according to a number of extending finger; and
determining a first distance between two of the feature points indicating fingertips in the hand image;
when the first distance is larger than a preset distance, determining, according to the number of finger(s), to perform one of preset operations to the display;
when the first distance is smaller than the preset distance, determining, according to the number of finger(s) and a second distance between the two of the feature points to generate a control signal under a currently performed operation from the preset operations for controlling an external device to perform an operation, and
wherein different values of the number of finger(s) correspond to different preset operations to the display and generating different control signals to control the external device to perform different operations.

8. The operating method of claim 7, further comprising following steps:
in response to a coordinate of a first feature point being greater than a coordinate of a second feature point, and a coordinate of a third feature point being less than a coordinate of a fourth feature point, determining the hand image having the number of finger(s),
wherein the first feature point, the second feature point, the third feature point and the fourth feature point are included in the hand image,
the first feature point and the second feature point correspond to a fingertip and a finger root of a first finger of the hand, respectively, and
the third feature point and the fourth feature point correspond to a fingertip and a finger root of a second finger of the hand, respectively.

9. The operating method of claim 7, wherein the feature points correspond to a wrist and joints of each finger.

10. The operating method of claim 7, further comprising:
according to a hand posture of the hand image, to perform at least one in following two operations: controlling the preset operation and generating the control signal.

11. The operating method of claim 7, wherein the preset operation at least comprises adjusting one of a volume of the display, a backlight brightness, a color display mode and a frame rate.

12. The operating method of claim 7, wherein the external device comprises a light or a home control device.

13. The operating method of claim 12, wherein the control signal is configured to control luminosity and/or a color temperature of the light.

14. A non-transitory electronic device readable medium, suitable for a display storing one or a plurality of program codes, the code(s) being read and executed by a processor to perform at least following steps:
   using a camera to capture an image of a hand to generate a hand image;
   determining a number of finger(s) appeared in the hand image according to feature points of the band image, further comprising: comparing coordinates of fingertip feature points with coordinates of finger root feature points to determine whether corresponding finger extends or not, and determining the number of finger(s) appeared in the band image according to a number of extending finger; and
   according to a value of the number of finger(s) to determine performing at least one of two operations in following:
      performing a preset operation to the display and generating a control signal for controlling an external device to perform an operation, and
      wherein different values of the number of finger(s) correspond to different preset operations to the display and generating different control signals to control the external device to perform different operations, and same value of the number of finger(s) but different hand postures corresponds to same preset operation to the display and generating same control signal to control the external device to perform same operation.

15. The electronic device readable medium of claim 14, wherein the feature points correspond to a wrist and joints of each finger.

16. The electronic device readable medium of claim 14, further comprising:
   according to a hand posture of the hand image, to perform at least one in following two operations: controlling the preset operation and generating the control signal.

17. The electronic device readable medium of claim 14, wherein the preset operation at least comprises adjusting one of a volume of the display, a backlight brightness, a color display mode and a frame rate.

18. The electronic device readable medium of claim 14, wherein the external device comprises a light or a home control device.

19. The electronic device readable medium of claim 18, wherein the control signal is configured to control luminosity and/or a color temperature of the light.

* * * * *